(12) United States Patent
Kjesbu et al.

(10) Patent No.: US 8,560,641 B2
(45) Date of Patent: Oct. 15, 2013

(54) ENHANCED MULTIMEDIA CAPABILITIES IN VIDEO CONFERENCING

(75) Inventors: Snorre Kjesbu, Slependen (NO); Espen Christensen, Oslo (NO)

(73) Assignee: Cisco Technology, Inc., San Jose, CA (US)

( * ) Notice: Subject to any disclaimer, the term of this patent is extended or adjusted under 35 U.S.C. 154(b) by 241 days.

(21) Appl. No.: 13/016,337

(22) Filed: Jan. 28, 2011

(65) Prior Publication Data

US 2011/0134206 A1    Jun. 9, 2011

Related U.S. Application Data

(63) Continuation of application No. 10/971,030, filed on Oct. 25, 2004, now abandoned.

(30) Foreign Application Priority Data

Oct. 24, 2003    (NO) .................................... 20034775

(51) Int. Cl.
    *G06F 15/16*    (2006.01)
(52) U.S. Cl.
    USPC ..................... 709/219; 455/412.1; 455/414.4; 455/466; 348/14.09; 370/260
(58) Field of Classification Search
    USPC .......................................................... 709/204
    See application file for complete search history.

(56) References Cited

U.S. PATENT DOCUMENTS

| | | | |
|---|---|---|---|
| 3,597,022 A | 8/1971 | Waldron | |
| 5,007,292 A | 4/1991 | Crowe et al. | |
| 5,555,017 A | 9/1996 | Landante et al. | |
| 5,625,407 A | 4/1997 | Biggs et al. | |
| 5,673,205 A | 9/1997 | Brunson | |
| 6,020,915 A | 2/2000 | Bruno et al. | |
| 6,111,972 A | 8/2000 | Rigondeau | |
| 6,130,952 A | 10/2000 | Akino et al. | |
| 6,314,302 B1 | 11/2001 | Haferbeck et al. | |
| 6,583,806 B2 | 6/2003 | Ludwig et al. | |
| 6,611,503 B1 | 8/2003 | Fitzgerald et al. | |
| 6,625,258 B1 | 9/2003 | Ram et al. | |
| 6,947,738 B2 | 9/2005 | Skog et al. | |
| 7,043,528 B2 | 5/2006 | Schmitt et al. | |

(Continued)

FOREIGN PATENT DOCUMENTS

FR    2 696 308    4/1994
GB    2 303 992 A    3/1997

(Continued)

*Primary Examiner* — Dustin Nguyen
(74) *Attorney, Agent, or Firm* — Oblon, Spivak, McClelland, Maier & Neustadt, L.L.P.

(57) ABSTRACT

The present invention relates to video conferencing and multimedia messaging, and takes advantage of the capabilities of the communication system to which the audio participants are connected, in order to increase the performance of all the participants in a mixed conference. In a preferred embodiment, the audio participants are provided with a MMS device, and a MMS Engine captures periodically, or at certain events, video conference data attached to MMS messages and addressed to the MMS device. In the opposite direction, the MMS device provides multimedia data to the conventional video conference participants by attaching the multimedia data to MMS messages, which are sent to the IP-addressable MMS Engine. The MMS Engine separates the multimedia data and converts it to a format compatible with the video conference. The converted multimedia data is then provided to video conference participants, and treated like any other multimedia stream included in the video conference.

13 Claims, 5 Drawing Sheets

(56) References Cited

U.S. PATENT DOCUMENTS

| | | |
|---|---|---|
| 7,069,301 B2 | 6/2006 | Jerbi et al. |
| 7,181,231 B2 | 2/2007 | Le Bodic et al. |
| 7,181,539 B1 | 2/2007 | Knight et al. |
| 7,630,705 B2 | 12/2009 | Galicia et al. |
| 2002/0083136 A1 | 6/2002 | Whitten, II |
| 2003/0158902 A1 | 8/2003 | Volach |
| 2004/0034723 A1 | 2/2004 | Giroti |
| 2007/0167188 A1 | 7/2007 | Linden |

FOREIGN PATENT DOCUMENTS

| | | |
|---|---|---|
| JP | 2000-115738 | 4/2000 |
| JP | 2003-163953 | 6/2003 |
| JP | 2003-271530 | 9/2003 |

# ENHANCED MULTIMEDIA CAPABILITIES IN VIDEO CONFERENCING

CROSS REFERENCE TO RELATED APPLICATIONS

The present continuation application claims the benefit of priority under 35U.S.C. 120 to application Ser. No. 10/971,030 (now abandoned), filed on Oct. 25, 2004, and claims the benefit of priority under 35 U.S.C. 119 from Norwegian Patent Application number 20034775, filed on Oct. 24, 2003, and the entire contents of both of which are hereby incorporated herein by reference. The present application contains subject matter related to U.S. application Ser. No. 10/699,849 (now U.S. Pat. No. 7,474,326), filed Nov. 4, 2003, U.S. application Ser. No. 10/699,850 (now U.S. Pat. No. 7,509,553), filed Nov. 4, 2003, U.S. application Ser. No. 10/724,043 (now U.S. Pat. No. 7,010,119), filed Dec. 1, 2003, U.S. application Ser. No. 10/722,479 (now U.S. Pat. No. 7,280,598), filed Nov. 28, 2003, U.S. application Ser. No. 10/819,108 (now U.S. Pat. No. 7,586,513), filed Apr. 7, 2004, pending U.S. application Ser. No. 10/831,158, filed Apr. 26, 2004, U.S. application Ser. No. 10/871,026 (now abandoned), filed Jun. 21, 2004, and U.S. application Ser. No. 10/880,460 (now U.S. Pat. No. 7,327,785), filed Jul. 1, 2004, and the entire contents of each are hereby incorporated herein by reference.

FIELD OF THE INVENTION

The present invention relates to video conferencing and multimedia messaging.

DISCUSSION OF THE BACKGROUND

In order to have a meeting involving participants not located in the same area, a number of technological systems are available. These systems may include video conferencing, web conferencing and audio conferencing.

The most realistic substitute for real meetings is high-end video conferencing systems. Conventional video conferencing systems comprise a number of end-points communicating real-time video, audio and/or data streams over WAN, LAN and/or circuit switched networks. The end-points include one or more monitors, cameras, microphones and/or data capture devices and a codec, which encodes and decodes outgoing and incoming streams, respectively. In addition, a centralized source, known as a Multipoint Control Unit (MCU), is needed to link the multiple end-points together. The MCU performs this linking by receiving the multimedia signals (audio, video and/or data) from end-point terminals over point-to-point connections, processing the received signals, and retransmitting the processed signals to selected end-point terminals in the conference.

The different conferencing systems are, however, not isolated from each other.

Different conferencing technologies now seem to merge, as conference meetings are getting more common and conference technology evolves. It is not unusual to find complete web or audio participants in a traditional video conference.

However, audio and web participants will not achieve the full benefit of the conferencing capabilities when joining a traditional video conference, because of both end-point and system limitations. Audio participants are not able to see the other participants, or data presentations, in the conference, while the video participants are not necessarily even aware of the presence of the audio participants. The latter is sometimes solved by showing an audio participant icon instead of a picture in the video image to indicate that an audio participant is present. This, however, provides little or no information about the participant.

SUMMARY OF THE INVENTION

It is an object of the present invention to provide a device, computer program product, and a method allowing audio participants in a conventional video conference to achieve increased performance of the conference.

In particular, embodiments of the present invention describe a MMS Engine adjusted to adopt MMS capabilities into a video conference, including one or more video participants associated with a respective video conferencing End Point, and one or more audio participants associated with a respective MMS device. The MMS Engine includes a capturing means configured to capture video conferencing data from a data source originating from one or more video conferencing End Points. A conversion means is configured to convert the video conferencing data to an appropriate format. A message generating means is configured to attach the converted video conferencing data to a message, and to insert into the message an address associated with the respective MMS device. A transmission means is configured to transmit the message according to the inserted address. For the purpose of transmitting multimedia data in the opposite direction, the MMS Engine includes MMS receiving means configured to receive an MMS message from the respective MMS device and separate attached multimedia data. A conversion means is configured to convert the multimedia data to a format compatible with the video conference, and a transmission means is configured to provide said converted multimedia data to the respective video conferencing End Point.

The present invention also provides methods and computer program products directed to the capabilities of the MMS Engine.

BRIEF DESCRIPTION OF THE DRAWINGS

In order to make the invention more readily understandable, the discussion that follows will refer to the accompanying drawings, wherein.

DESCRIPTION OF THE PREFERRED EMBODIMENTS

In the following, the present invention will be discussed by describing a preferred embodiment, and by referring to the accompanying drawings. However, people skilled in the art will realize other applications and modifications of the present invention.

The present invention takes advantage of the capabilities of the communication system to which the audio participants are connected, to increase the performance of all the participants in a mixed conference. There are many multimedia features in digital communication networks. An example is the Multimedia Messaging System (MMS) standardized by the third Generation Partnership Project (3GPP).

MMS has evolved from the popularity of the SMS messaging system, and is using the Wireless Application Protocol (WAP). WAP is a protocol that permits mobile devices to communicate with Internet servers via the mobile radio communications network. Since displays on mobile devices are much smaller (typically, 150×150 pixels) than computer monitor displays (typically, at least 640×480 pixels), a website designed to be displayed on a computer monitor cannot be displayed on a mobile device with any practicality. Also, mobile devices have considerably less processing power than personal computers.

Accordingly, WAP was developed to allow mobile devices to access special Internet sites designed to be displayed on a mobile device, and to provide an interface between the mobile device and the Internet. MMS, however, is a standard for sending and receiving multimedia messages. The multimedia messages can include any combination of formatted text, images, photographs, audio and video clips. The images can be in any standard format such as GIF and JPEG. Video formats such as MPEG4 and audio formats such as MP3 and MIDI are also supported by MMS.

Figure 1:
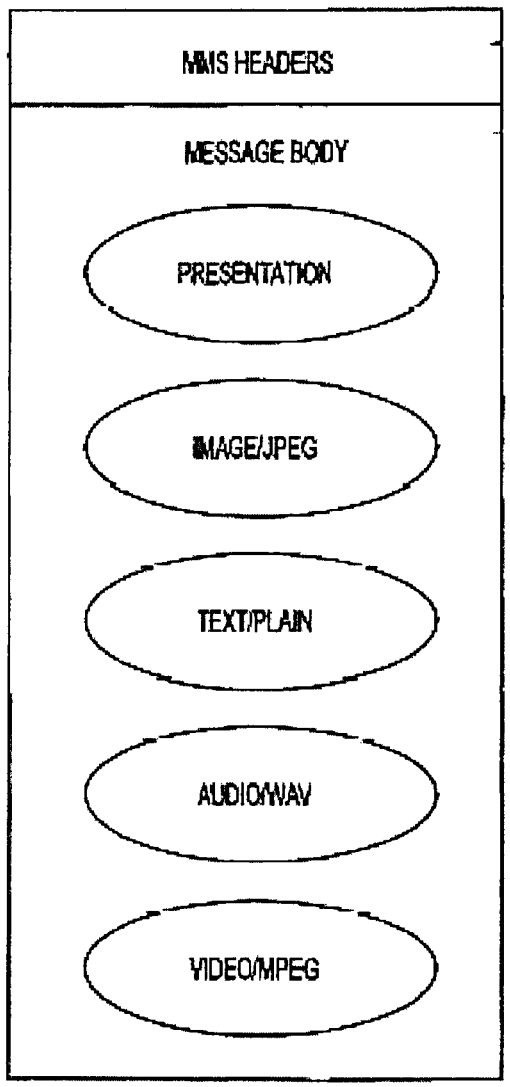
FIG. 1 depicts the format of an MMS message.

The typical format of a MMS message is illustrated in FIG. 1. The MMS message includes headers 1. The headers 1 provide the routing information and addresses of the recipients and senders of the MMS message. The message body includes the multimedia message, which in turn may include: images which may be in the form of JPEG, formatted or plain text; audio which may be in the form of a wave file; video which may be in the form of a MPEG file, and may optionally include a presentation file which presents the multimedia content to the recipient of the multimedia message.

Figure 2:
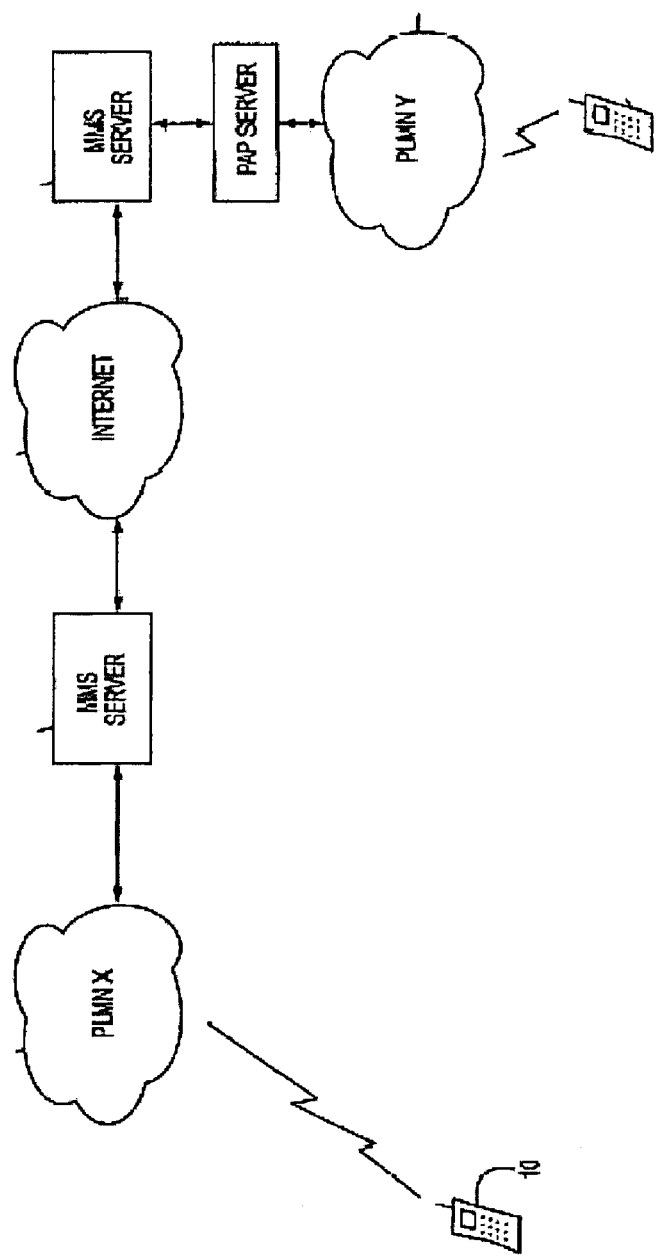
FIG. 2 depicts a conventional MMS architecture.

An illustration of the MMS traffic routing sequence in a traditional peer-to-peer MMS routing is shown in FIG. 2. A user of a mobile device has an MMS message that the user would like to send to another mobile device. The mobile device sends the MMS message to a MMS server via PLMN X. The MMS server routes messages through the Internet using SMTP and an e-mail address. Since the message sent by the mobile device was addressed to the recipient's MSISDN number, the MMS server must determine the address of the recipient's MMS server in order to route the multimedia message to the recipient's MMS server. If the MMS server is able to identify the MMS server of the recipient's mobile device by its MSISDN number, the multimedia message is routed to the recipients MMS server via the Internet, using SMTP and an e-mail address of the recipient's MMS server. The MMS server then sends a multimedia message notification to a Push Access Protocol (PAP) server. The PAP server is a Push Gateway for pushing messages to the mobile device, using the WAP forum standard. The PAP server sends a notification to the mobile device via a second Public Land Mobile Network Y (PLMN Y). The recipient's mobile device pulls the MMS message from MMS server via PLMN Y. In response to the mobile device's pull, the MMS server routes the multimedia message to the recipient's mobile device via the PLMN Y. The multimedia message is received in the mobile device where it can be presented, played, or displayed to a user of the mobile device.

Figure 3:
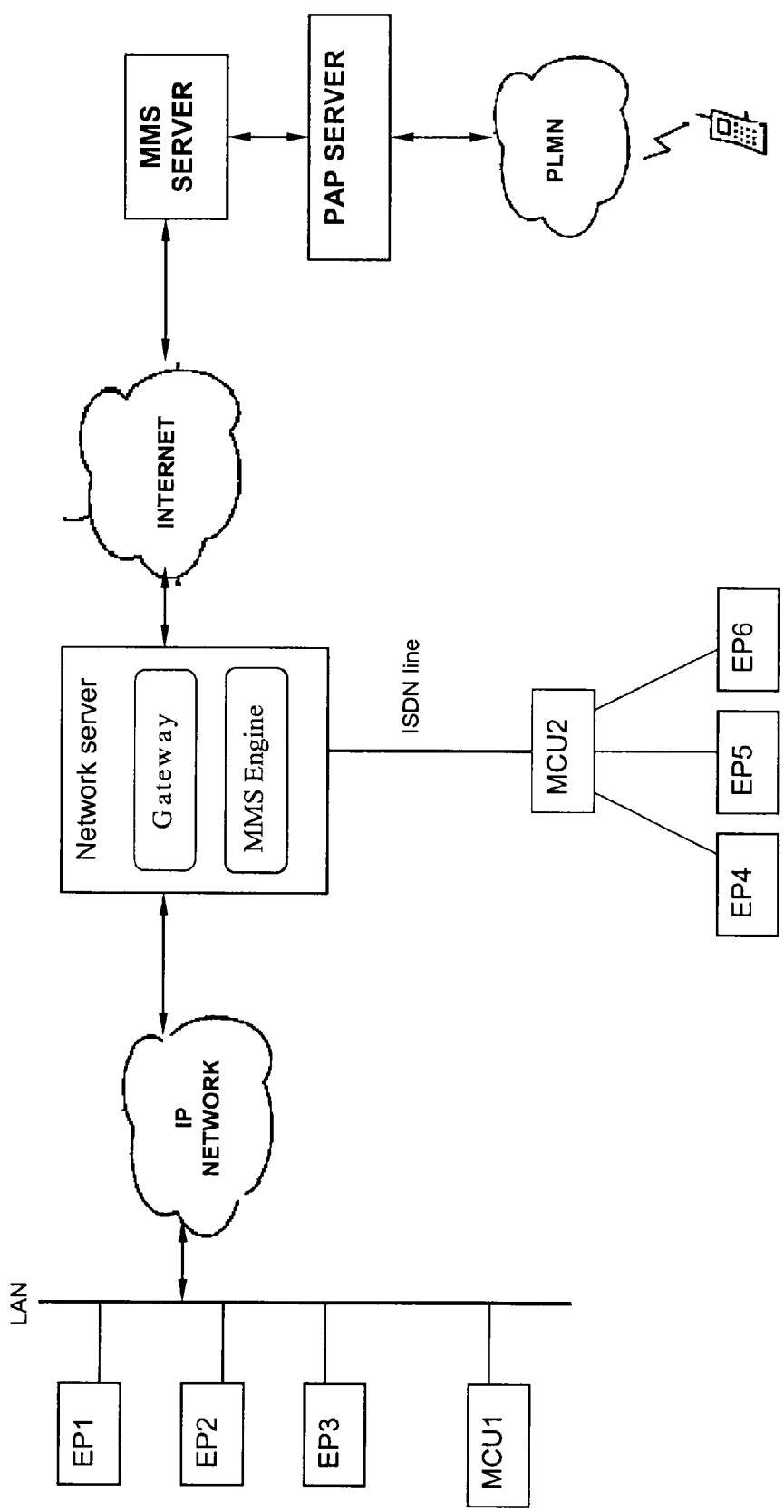
FIG. 3 depicts video conference architecture connected to a part of a conventional MMS architecture.

The basics of the present invention are to utilize the architecture and multimedia capabilities of the MMS system in order to improve the performance and benefits of the audio participants in a video conference. One preferred embodiment is depicted in FIG. 3. Compared to the architecture of FIG. 2, the left-hand side MMS infrastructure associated with one of the peers, is replaced with a video conferencing system. The system includes a first number of End Points (EP) with an associated first MCU1 connected to a Local Area Network (LAN), which in turn is connected to a Network server being an embedded Gateway supplemented with an MMS Engine. A second number of EPs with an associated second MCU2 are also in communication with the Network server through an ISDN line.

The EPs, MCUs and Gateway operate in the video conferencing system like conventional video conferencing nodes. The EPs captures multimedia data, encode the data, and forward it to further processing in the MCUs. The processing in the MCUs provides mixing of video, and prepares a coded multimedia data signal that is being sent to each of the participating conferencing EPs, which in turn decode the multimedia data signal and present it to the respective users. The Gateway provides communication between EPs and MCUs operating at different protocols. The most important task of a Gateway is to convert the multimedia data dedicated for transmission over ISDN to multimedia data dedicated to IP transmission. The Gateway is conventionally used for connecting a LAN to an external ISDN connection, allowing enterprise EPs to communicate with external EPs.

In the preferred embodiment of the present invention, the Gateway is incorporated in a Network server, also including an MMS Engine, providing increased performance of audio participants in a video conference. It will become apparent from the following description that because the MMS Engine and the Gateway have some similar characteristics, they are installed in the same node. As an example, both the MMS Engine and the Gateway provide protocol conversion, and they are both appropriately placed in the boundary between a local and a public communication network.

The MMS Engine provides conversion of video conference content to a conventional MMS content, which is to be transmitted to one or more audio participants using, e.g., a cellular phone adjusted to receive MMS messages. The MMS Engine also provides conversion of MMS content, received from one or more audio participants, to a format that is applicable for the video conference in which the audio participant(s) take(s) part.

Figure 4:
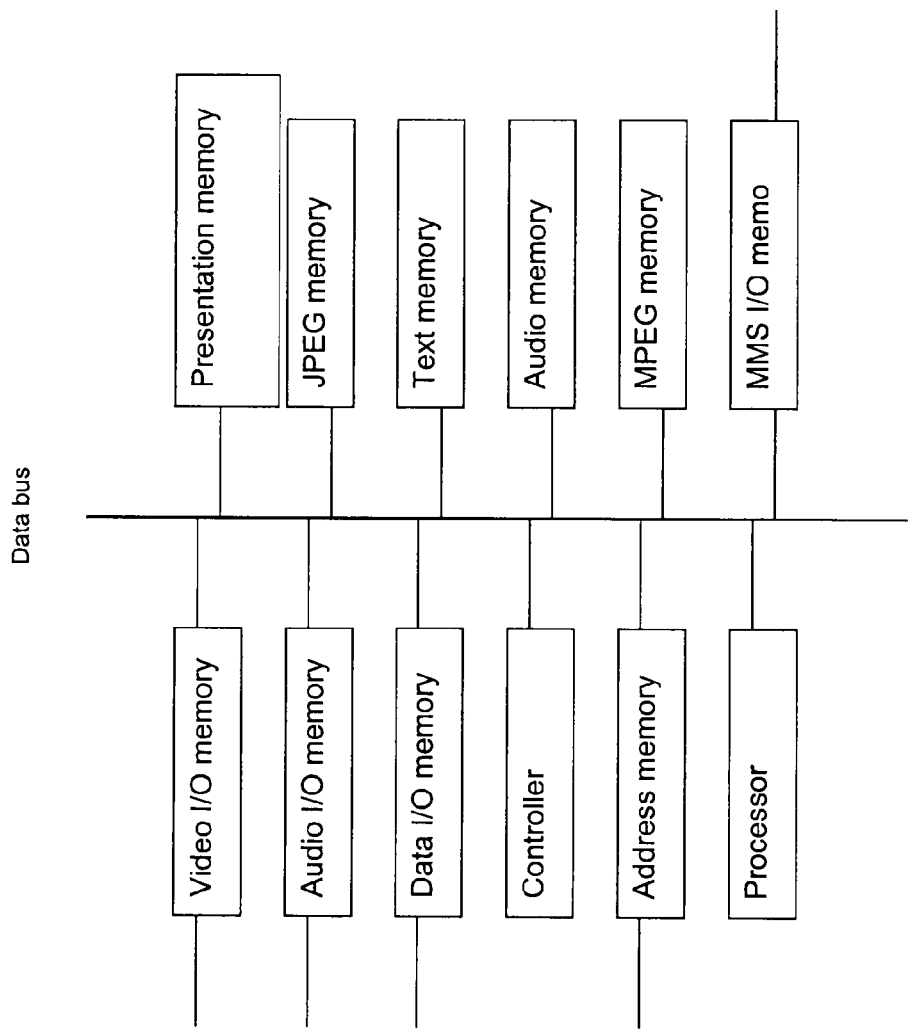
FIG. 4 depicts an MMS Engine according to a preferred embodiment of the present invention.

One embodiment of the MMS Engine is illustrated in FIG. 4. On the left-hand side of the data bus, several temporary I/O memories are shown, respectively associated with media data of conventional video conferencing format, in addition to a Controller and a Processor. On the right-hand side of the data bus, several temporary I/O memories are also shown, each associated with a respective field in a typical MMS message format, in addition to an MMS message I/O memory.

Focusing now on the first mentioned direction of conversion, consider the video conference is currently viewing a video picture captured from EP1 transmitted to all the other participants. The coded video picture is routed via MCU 1 and through the IP Network to the Network Server. In the Network server, the coded video picture is decoded providing a video picture of a conventional video conferencing format like QCIF, CIF or 4CIF.

The MMS Engine is configured to capture a snapshot of the video picture at certain predefined time intervals, or at certain events, i.e., selecting one of the images in the stream of still images constituting the video picture. This is implemented in the images consecutively being stored in a temporary memory, either in the Video I/O Memory, or in the Data I/O Memory of the MMS Engine, whose content is fetched at the actual moment of snapshot capturing, and forwarded to the Processor via the data bus. The actual time of fetching is controlled by the Controller. The processor determines the original format of the image, and converts the content to a JPEG format according to a pre-stored algorithm. The conversion may also include scaling of the picture for adjusting the size to a small screen. The Controller further conveys the JPEG image to the JPEG memory, and when the time has come to transmit an MMS message to one or more audio participants, a MMS message is created by the processor according to the format depicted in FIG. 1, whose content is decided by the Controller. The address of the MMS recipient (s) is/are inserted in the MMS header, and as the complete MMS message is put in the MMS I/O memory, the MMS message with the snapshot from EP1 in JPEG format is ready for transmission to the MMS server(s), with which the recipient(s) is/are associated.

The address inserted in the MMS header is an e-mail address. The MMS message is routed to the MMS server in the conventional way using SMTP, and the MMS content is pulled from the MMS server(s) to the recipient(s). The MMS e-mail addresses of participating audio participants must be stored in the Address memory at conference set-up, or when new audio participant with MMS capabilities enters an ongoing conference.

Note that the snapshot is not limited to include content from one single participant, but can also include so-called CP pictures (Continuous Presence), which is a mix of pictures from several participants. Also note that the image attached to the MMS message is not limited to a certain format or a still picture, but can also be a video sequence, e.g. in MPEG format. The video sequences could be fetched directly from the Video I/O memory, or generated by fetching and merging still pictures.

Turning now to the opposite direction of the MMS flow, consider that the video conference is currently viewing a Continuous Presence (CP) view including a video picture of all the participants, except for the receiver of the CP, and a regularly updated still picture captured by the only audio participant in the video conference. The audio participant is provided with a cellular phone with MMS capabilities, and a camera. When the audio participant enters into the conference, it is provided with an e-mail address associated with the conference and/or the Network server. The e-mail address may be transmitted from the Network Server as a MMS message (e.g. as the transmitting address, or "return path", of the first MMS message including video conference data transmitted in the opposite direction), and may be intended for manual use, or may be automatically inserted into the memory of the cellular phone for later use during the conference. E-mail addresses and/or other data may also be exchanged between the network server and the cellular phone/MMS server by means of a proprietary signalling protocol during call set-up.

When a call is set up from the cellular phone to the conference, a picture is captured by the camera associated with the cellular phone, and inserted into an MMS message addressed to the conference. The MMS message is then transmitted to the Network Server via the MMS server through the Internet by means of SMTP. When receiving the MMS message, a conference ID is either provided by investigating the e-mail address, or by investigating the transmitter address found in the MMS header. The MMS message is inserted in the MMS I/O memory, and the Controller initiates the Processor to separate the different media elements included in the message, and inserts them in the respective memories. The JPEG picture now residing in the JPEG memory is then converted to a proper format used in the CP view of the conference, and inserted into the Video or Data I/O memory. The picture is fetched from the memory, then coded and transmitted to the MCU mixing the CP views of the conference, according to the earlier provided conference ID. The MCU then inserts the still picture, originally captured by the cellular phone, in the sixth CP field, together with the five other video pictures. An alternative to conversion could be to transmit the multimedia data separated from the MMS message directly to the MCU or the video conferencing End Points. This would require that the receiver was IP-addressable, for e.g. pushing out the multimedia data.

In the case of viewing audio participants by the same still picture during the whole conference, it might be convenient to reuse earlier received pictures in order to reduce transmission time and costs. For this purpose, a picture received from a certain audio participant registered in a directory connected to an End-Point or a management tool, could be stored in the directory together with other information about the participant. When the audio participant later on participates in a conference which includes the video conferencing device with the directory, the corresponding picture can be fetched out and used for viewing the audio participant, without having to retransmit the picture.

The above described embodiment of the present invention represents an MMS Engine implemented together with, or incorporated in, a Gateway. However, the MMS Engine does not necessarily have to be connected to a Gateway, but could also be stand-alone device, or incorporated in other video conferencing nodes, like in a MCU, or in the End Points. It could also be a part of a Management Tool associated with the video conferencing system. In any case, the MMS Engine, or a node in which it is incorporated in or connected to, has to be addressable according to the Internet Protocol. Further, the description also focuses on capturing and transmitting still pictures between a video conference and one or more audio participants with multimedia capabilities. However, the multimedia content is not limited to still pictures, but can also consist of video, text and/or audio, in which case, it is distributed in the respective memories in the MMS Engine at conversion. In addition, it is possible to incorporate more than one MMS engine into the above described embodiments.

The present invention also includes an aspect wherein the multimedia data is transferred to MMS capable audio participants by means of e-mails. In the MMS Engine, the multimedia data is in this case attached to a conventional e-mail after conversion, which is transmitted to the MMS device via the MMS server. How the MMS server and device handle the e-mail is operator dependent, but it is a well-known fact that transmitting an e-mail to a MMS device is allowed; addressing the e-mail with phonenumber@domain. The MMS device will receive the e-mail as a MMS message, in which the e-mail text and the attachments are inserted in the MMS entries.

As already indicated, a snapshot or other multimedia content may be captured and transferred at predefined points of time, or at certain events. In one embodiment, such an event occurs at the time when a considerable change in the content of the source picture (video or still picture), from which present snapshot originates, is detected. The detection may take place e.g. in the Network server illustrated in FIG. 3. According to one embodiment of this aspect of the invention, the previously transmitted snapshot is stored in the Network server, and the snapshot is continuously compared to the source picture. The comparison may be carried through in a pixel-by-pixel fashion, or one or more values associated with the snapshot may be compared with one or more corresponding values associated with the source picture. When the difference(s) between the values is/are more than (a) predefined threshold(s), transmission of a new snapshot to the one or more audio participants is initiated. This means that the Controller of FIG. 4 enables reading from the Video or Data I/O memory via the data bus to the processor, which in turn converts the snapshot from present format to JPEG, then inserting the JPEG image into the JPEG memory.

One event that could trigger a new snapshot transmission is a page shift in a presentation. Another example is when voice switching is active, and the floor is shifting. A completely different image will then occur as the main video picture in the conference, and a new snapshot transmission will be initiated.

Alternatively to the event-initiated snapshot (or other multimedia data) capturing new snapshots could also be transmitted periodically; capturing the first snapshot at call set-up. Transmission of multimedia data in the opposite direction, from the audio participant(s) to the video conference, could be initiated accordingly, but the decision mechanism is likely to be implemented in the MMS device or somewhere else in the MMS or cellular network architecture. In case of implementing the decision mechanism in the MMS device, some proprietary software would have to be installed.

There are also other reasons for installing tailored software in a cellular phone, providing it with enhanced possibilities for participating in a conventional video conference. In order to increase the performance and benefits for audio participants, achieving the enhanced MMS features of the present invention should be as intuitive and little exhausting as possible. The participation would be inconvenient if the user has to manually transmit and receive pictures during the conference. Thus, according to the preferred embodiment of the present invention, the MMS device is configured with software allowing it to both send and receive signalling messages concerning the snapshot capturing, transmission and reception, alternatively in addition to merge content received at different points of time, providing continuity in the presentation of multimedia data from the conference. The software is adjusted to receive and store the e-mail address of the Network server/conference, and automatically fetches this address and inserts it in the MMS header when transmitting multimedia data to the conference. The software is preferably installed as Java-scripts, as this is a flexible tool for providing small devices with tailored features. Additionally, most cellular phones and mobile devices are now equipped with Java-technology.

Preferably, snapshot capturing at the video conferencing side should also be possible to initiate, either manually or automatically, remotely from an audio participant. In the preferred embodiment of the present invention, the software installed in the cellular phone is therefore configured to be able to generate and transmit a request for snapshot capturing to the Network server. In response, the MMS Engine captures a snapshot (or other multimedia data) from one of the I/O memory, converts it to a proper format and returns the snapshot to the MMS device of the audio participant.

In some cases, the multimedia content received at different times in the MMS device could benefit from merging the content together, and thereby providing continuity in the data transmitted via MMS from the video conference. For example, a real-time video presentation could be created from a number of snapshots, or video pieces, consecutively transmitted in separate MMS messages from the MMS Engine. The software is in this case also configured to consecutively receive and store the incoming multimedia data, and to present it on the screen of the MMS device in such a way that it appears to be a continuous video stream.

However, a real-time video presentation implies transmission of large and/or many MMS messages, and will probably require a substantial bandwidth all the way to the audio participant. The bandwidth requirement could, however, be reduced, instead of converting the video conference pictures to a JPEG format in the MMS Engine, by coding the pictures according to standard or proprietary coding techniques, and inserting the respective encoded pictures in one of the entries in the MMS messages as general attachments. In this case, the software in the cellular phone also has to be configured to be able to decode the attachments in the MMS messages, according to the coding techniques used by the MMS Engine.

The tasks of the software in the cellular phone described above would require some signalling and negotiation between the MMS device and the MMS Engine. This exchange of information could be inserted in the text or presentation fields (temporarily in the text or presentation memory in the MMS Engine) of the MMS messages still being transmitted, creating a virtual, separate signalling channel. This information may include snapshot requests, type of events initiating snapshot capturing, and synchronisation information.

The embodiments of the present invention appear in the description above as an MMS Engine integrating MMS capabilities in conventional video conferencing. However, the basic idea of the present invention can also be embodied in an overall method. The method includes in one direction capturing video conferencing data, e.g., a snapshot of the video picture of one or more participant, or a CP picture, converting the data to a proper format, and inserting the converted data as an attachment in an MMS message. The MMS message is transmitted from an IP-addressable device to one or more MMS capable audio participants via the MMS infrastructure. The audio participant fetches the video conferencing data attached to the MMS message, and presents the data as a part of the conference in which the audio participant takes part.

In the opposite direction, the audio participant captures some kind of multimedia data, normally a still picture, or some other data presenting the audio participant, and inserts the multimedia data into an MMS message. The MMS message is addressed and transmitted to an IP-addressable node connected to the video conferencing system. The attachment is then fetched from the MMS message and converted to a proper video conferencing format. The converted multimedia data is then coded and transmitted to one or more of the conventional video conferencing participants, optionally subsequent to mixing it with data from other participants.

Figure 5:
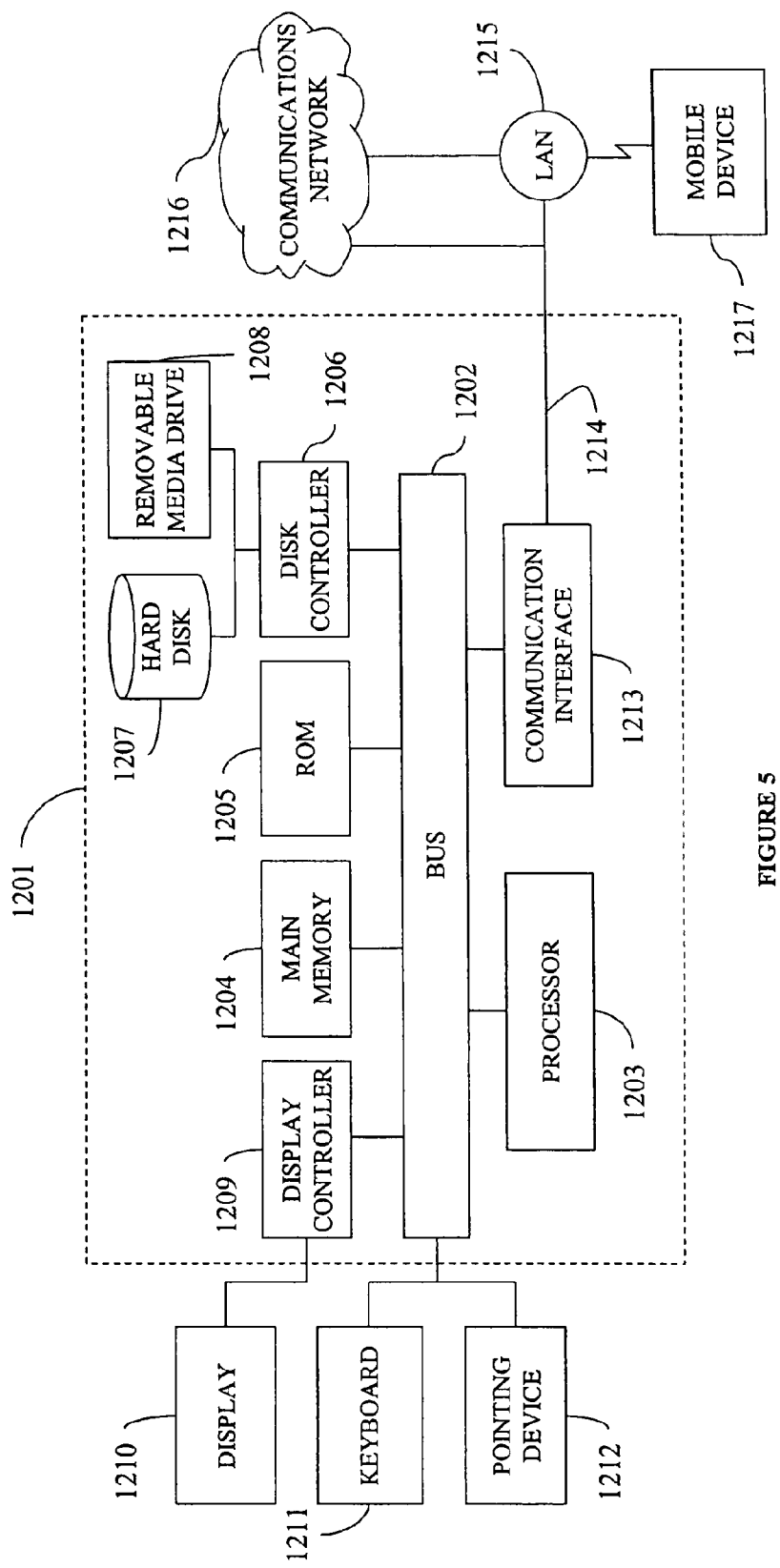
FIG. 5 depicts a computer system upon which an embodiment of the present invention may be implemented.

FIG. 5 illustrates a computer system 1201 upon which an embodiment of the present invention may be implemented. The computer system 1201 includes a bus 1202 or other communication mechanism for communicating information, and a processor 1203 coupled with the bus 1202 for processing the information. The computer system 1201 also includes a main memory 1204, such as a random access memory (RAM) or other dynamic storage device (e.g., dynamic RAM (DRAM), static RAM (SRAM), and synchronous DRAM (SDRAM)), coupled to the bus 1202 for storing information and instructions to be executed by processor 1203. In addition, the main memory 1204 may be used for storing temporary variables or other intermediate information during the execution of instructions by the processor 1203. The computer system 1201 further includes a read only memory (ROM) 1205 or other static storage device (e.g., programmable ROM (PROM), erasable PROM (EPROM), and electrically erasable PROM (EEPROM)) coupled to the bus 1202 for storing static information and instructions for the processor 1203.

The computer system 1201 also includes a disk controller 1206 coupled to the bus 1202 to control one or more storage devices for storing information and instructions, such as a magnetic hard disk 1207, and a removable media drive 1208 (e.g., floppy disk drive, read-only compact disc drive, read/ write compact disc drive, compact disc jukebox, tape drive, and removable magneto-optical drive). The storage devices may be added to the computer system 1201 using an appropriate device interface (e.g., small computer system interface (SCSI), integrated device electronics (IDE), enhanced-IDE (E-IDE), direct memory access (DMA), or ultra-DMA).

The computer system 1201 may also include special purpose logic devices (e.g., application specific integrated circuits (ASICs)) or configurable logic devices (e.g., simple programmable logic devices (SPLDs), complex programmable logic devices (CPLDs), and field programmable gate arrays (FPGAs)).

The computer system 1201 may also include a display controller 1209 coupled to the bus 1202 to control a display 1210, such as a cathode ray tube (CRT), for displaying information to a computer user. The computer system includes input devices, such as a keyboard 1211 and a pointing device 1212, for interacting with a computer user and providing information to the processor 1203. The pointing device 1212, for example, may be a mouse, a trackball, or a pointing stick for communicating direction information and command selections to the processor 1203 and for controlling cursor movement on the display 1210. In addition, a printer may provide printed listings of data stored and/or generated by the computer system 1201.

The computer system 1201 performs a portion or all of the processing steps of the invention in response to the processor 1203 executing one or more sequences of one or more instructions contained in a memory, such as the main memory 1204. Such instructions may be read into the main memory 1204 from another computer readable medium, such as a hard disk 1207 or a removable media drive 1208. One or more processors in a multi-processing arrangement may also be employed to execute the sequences of instructions contained in main memory 1204. In alternative embodiments, hard-wired circuitry may be used in place of or in combination with software instructions. Thus, embodiments are not limited to any specific combination of hardware circuitry and software.

As stated above, the computer system 1201 includes at least one computer readable medium or memory for holding instructions programmed according to the teachings of the invention and for containing data structures, tables, records, or other data described herein. Examples of computer readable media are compact discs, hard disks, floppy disks, tape, magneto-optical disks, PROMs (EPROM, EEPROM, flash EPROM), DRAM, SRAM, SDRAM, or any other magnetic medium, compact discs (e.g., CD-ROM), or any other optical medium, punch cards, paper tape, or other physical medium with patterns of holes, a carrier wave (described below), or any other medium from which a computer can read.

Stored on any one or on a combination of computer readable media, the present invention includes software for controlling the computer system 1201, for driving a device or devices for implementing the invention, and for enabling the computer system 1201 to interact with a human user (e.g., print production personnel). Such software may include, but is not limited to, device drivers, operating systems, development tools, and applications software. Such computer readable media further includes the computer program product of the present invention for performing all or a portion (if processing is distributed) of the processing performed in implementing the invention.

The computer code devices of the present invention may be any interpretable or executable code mechanism, including but not limited to scripts, interpretable programs, dynamic link libraries (DLLs), Java classes, and complete executable programs. Moreover, parts of the processing of the present invention may be distributed for better performance, reliability, and/or cost.

The term "computer readable medium" as used herein refers to any medium that participates in providing instructions to the processor 1203 for execution. A computer readable medium may take many forms, including but not limited to, non-volatile media, volatile media, and transmission media. Non-volatile media includes, for example, optical, magnetic disks, and magneto-optical disks, such as the hard disk 1207 or the removable media drive 1208. Volatile media includes dynamic memory, such as the main memory 1204. Transmission media includes coaxial cables, copper wire and fiber optics, including the wires that make up the bus 1202. Transmission media also may also take the form of acoustic or light waves, such as those generated during radio wave and infrared data communications.

Various forms of computer readable media may be involved in carrying out one or more sequences of one or more instructions to processor 1203 for execution. For example, the instructions may initially be carried on a magnetic disk of a remote computer. The remote computer can load the instructions for implementing all or a portion of the present invention remotely into a dynamic memory and send the instructions over a telephone line using a modem. A modem local to the computer system 1201 may receive the data on the telephone line and use an infrared transmitter to convert the data to an infrared signal. An infrared detector coupled to the bus 1202 can receive the data carried in the infrared signal and place the data on the bus 1202. The bus 1202 carries the data to the main memory 1204, from which the processor 1203 retrieves and executes the instructions. The instructions received by the main memory 1204 may optionally be stored on storage device 1207 or 1208 either before or after execution by processor 1203.

The computer system 1201 also includes a communication interface 1213 coupled to the bus 1202. The communication interface 1213 provides a two-way data communication coupling to a network link 1214 that is connected to, for example, a local area network (LAN) 1215, or to another communications network 1216 such as the Internet. For example, the communication interface 1213 may be a network interface card to attach to any packet switched LAN. As another example, the communication interface 1213 may be an asymmetrical digital subscriber line (ADSL) card, an integrated services digital network (ISDN) card or a modem to provide a data communication connection to a corresponding type of communications line. Wireless links may also be implemented. In any such implementation, the communication interface 1213 sends and receives electrical, electromagnetic or optical signals that carry digital data streams representing various types of information.

The network link 1214 typically provides data communication through one or more networks to other data devices. For example, the network link 1214 may provide a connection to another computer through a local network 1215 (e.g., a LAN) or through equipment operated by a service provider, which provides communication services through a communications network 1216. The local network 1214 and the communications network 1216 use, for example, electrical, electromagnetic, or optical signals that carry digital data streams, and the associated physical layer (e.g., CAT 5 cable, coaxial cable, optical fiber, etc). The signals through the various networks and the signals on the network link 1214 and through the communication interface 1213, which carry the digital data to and from the computer system 1201 maybe implemented in baseband signals, or carrier wave based signals. The baseband signals convey the digital data as unmodulated electrical pulses that are descriptive of a stream of digital data bits, where the term "bits" is to be construed broadly to mean symbol, where each symbol conveys at least one or more information bits. The digital data may also be used to modulate a carrier wave, such as with amplitude, phase and/or frequency shift keyed signals that are propagated over a conductive media, or transmitted as electromagnetic waves through a propagation medium. Thus, the digital data may be sent as unmodulated baseband data through a "wired" communication channel and/or sent within a predetermined frequency band, different than baseband, by modulating a carrier wave. The computer system 1201 can transmit and receive data, including program code, through the network(s) 1215 and 1216, the network link 1214 and the communication interface 1213. Moreover, the network link 1214 may provide a connection through a LAN 1215 to a mobile device 1217 such as a personal digital assistant (PDA) laptop computer, or cellular telephone.

Numerous modifications and variations of the present invention are possible in light of the above teachings. It is therefore to be understood that within the scope of the appended claims, the invention may be practiced otherwise than as specifically described herein.

The invention claimed is:

1. An apparatus comprising:
a Multimedia Messaging System (MMS) Engine configured to enable MMS capabilities in a video conference, including one or more video participants associated with a respective video conferencing end point, and one or more audio participants associated with a respective MMS device,
said MMS engine including a processor that
captures an image or a sequence of video from a video stream used in the video conference at a predefined time interval or predefined event , said video stream originating from one or more video conferencing end points or Multipoint Control Units (MCUs),
converts said video conferencing data to a MMS attachable format,
attaches said converted video conferencing data to a MMS message,
inserts, into said MMS message, an address associated with the respective MMS device, and
transmits said MMS message according to said inserted address.

2. The apparatus according to claim 1, wherein said predefined event occurs when a video source is changed, or when a difference between a previously captured image or a sequence of video and content generated from a data source is larger than a predefined threshold.

3. The apparatus according to claim 1, wherein said predefined event occurs when a request for an updated image or a sequence of video is received from the respective MMS device.

4. The apparatus according to claim 1, wherein said predefined event occurs when a video or audio participant leaves or enters the video conference.

5. The apparatus according to claim 1, wherein the image or the sequence of video is inserted in a corresponding MMS entry in said MMS message and said address is an address of a MMS server associated with said respective MMS device.

6. The apparatus according to claim 1, wherein said processor captures the image.

7. The apparatus according to claim 1, wherein said processor captures the video sequence.

8. The apparatus according to claim 1, wherein the MMS Engine is incorporated in, or connected to, a Gateway, an MCU or an end point.

9. A method enabling Multimedia Messaging System (MMS) capabilities in a video conference including one or more video participants associated with a respective video conferencing end point, and one or more audio participants associated with a respective MMS device, comprising:
capturing, at an MMS engine, an image or a sequence of video from a video stream used in the video conference at a predefined time interval or predefined event, said video stream originating from one or more video conferencing end points or Multipoint Control Units (MCUs);
converting, at the MMS engine, said image or said sequence of video to a MMS attachable format;
attaching, at the MMS engine, said converted image or sequence of video to a MMS message;
inserting, at the MMS engine, into said MMS message an address associated with a respective MMS device; and
transmitting, at the MMS engine, said MMS message according to said inserted address.

10. A method according to claim 9, wherein said step of inserting further comprises:
inserting the image or the sequence of video in a corresponding MMS entry in said MMS message, wherein said address is an address of an MMS server associated with said respective MMS device.

11. The method according to claim 9, wherein said capturing captures the image.

12. The method according to claim 9, wherein said capturing captures the video sequence.

13. A non-transitory computer readable storage medium encoded with instructions, which when executed by a processor of a Multimedia Messaging System (MMS) engine causes the MMS engine to execute a method enabling MMS capabilities in a video conference including one or more video participants associated with a respective video conferencing end point, and one or more audio participants associated with a respective MMS device, said method comprising:
capturing, at an MMS engine, an image or a sequence of video from a video stream used in the video conference at a predefined time interval or predefined event , said video stream originating from one or more video conferencing end points or Multipoint Control Units (MCUs);
converting, at the MMS engine, said image or said sequence of video to a MMS attachable format;
attaching, at the MMS engine, said converted image or sequence of video to a MMS message;
inserting, at the MMS engine, into said MMS message an address associated with a respective MMS device; and
transmitting, at the MMS engine, said MMS message according to said inserted address.

* * * * *